United States Patent [19]
Nilsen et al.

[11] Patent Number: 5,375,649
[45] Date of Patent: Dec. 27, 1994

[54] VENTILATION DEVICE

[76] Inventors: Trond Nilsen, Engerjordet 19, N-1310 Blommenholm; Erling Normann, Bjorketun 6, N-7650 Verdal, both of Norway

[21] Appl. No.: 108,555
[22] PCT Filed: Dec. 23, 1992
[86] PCT No.: PCT/NO92/00205
    § 371 Date: Sep. 30, 1993
    § 102(e) Date: Sep. 30, 1993
[87] PCT Pub. No.: WO93/13364
    PCT Pub. Date: Jul. 8, 1993

[30] Foreign Application Priority Data

Dec. 23, 1991 [NO] Norway .................. 915078

[51] Int. Cl.$^5$ .................................. F28D 17/00
[52] U.S. Cl. .................................. 165/4; 165/54; 165/97; 165/7
[58] Field of Search .................. 165/4, 7, 54, 97

[56] References Cited

U.S. PATENT DOCUMENTS

| | | | |
|---|---|---|---|
| 2,011,117 | 8/1935 | Richter | 165/4 |
| 3,263,400 | 8/1966 | Hobe et al. | 165/4 |
| 3,941,185 | 3/1976 | Henning | 165/97 |
| 4,261,255 | 4/1981 | Anderson et al. | |
| 4,711,293 | 12/1987 | Niwa et al. | |
| 5,050,667 | 9/1991 | Berner et al. | 165/97 |

FOREIGN PATENT DOCUMENTS

| | | | |
|---|---|---|---|
| 3224277 | 12/1983 | Germany | 165/54 |
| 3613942 | 10/1987 | Germany | 165/4 |
| 47942 | 3/1983 | Japan | 165/54 |
| 171517 | 5/1960 | Sweden | |
| 164060 | 12/1983 | Sweden | |
| 459206 | 12/1985 | Sweden | |

*Primary Examiner*—Albert W. Davis, Jr.
*Attorney, Agent, or Firm*—Chilton, Alix & Van Kirk

[57] ABSTRACT

Ventilation device with a heat exchange element, preferably for arrangement in an outer wall (13) of premises which are to be ventilated with balanced volumes of ambient air (15). The ventilation device comprises a pair of air flow passages (23A,23B) each including two separate ventilation tubes (16,19) aligned in the direction of air flow, with generally identical heat exchange elements (18,22) at the ends thereof. A fan (24A,24B) is located centrally between the two heat exchange elements in each passage.

14 Claims, 1 Drawing Sheet

VENTILATION DEVICE

BACKGROUND OF THE INVENTION

The present invention relates to a ventilation device with a heat exchanger, and more specifically, to a ventilation device of the type installed in an outer wall of a room.

The increasing importance of energy saving and demand for air exchange, particularly in polluted premises, has created a demand for efficient ventilation devices with heat exchange. Devices are known which involve an interchange operation wherein during one interval of operation one or more heat exchange elements are heated by exhausting room air and this heat is released to ingoing ambient air in a following interval of operation.

Known ventilation devices with reversible fans for simultaneously interchanging suction and exhaust, are not able to provide balance in the air delivery when the air direction is changed, as different pressure losses encountered with different directions create unequal air transport volumes. To achieve air balance during operation of the device, velocity control of the reversible fans is needed. Instantaneous adjustment of differences in pressure loss by controlling the fan velocity requires complicated and expensive equipment, and is difficult to achieve.

SUMMARY OF THE INVENTION

The general object of the present invention is to provide a ventilation device with heat exchanger suitable for controlled air exchange with heat recovery in premises having demanding requirements as to noise and air balance, e.g., rooms of domestic dwellings.

It is a particular object to provide a ventilation device with equal pressure distribution and equal air volumes in both suction and exhaust directions and with low pressure losses to enable the use of low noise radial fans. The device should also be of simple construction and be easy to clean and service.

These objects are achieved in accordance with the present invention, by a ventilation arrangement or unit for installation in an outer wall of a room, wherein each of two ventilation passages has a heat exchange element and a fan connected to a control system for reversing the flow direction, each ventilation passage has two separate and generally identical heat exchange elements, and the fan in each passage is arranged generally centrally between the heat exchange elements. Preferably, a dividing wall is provided mid-way along the flow axis between the heat exchange elements of each passage, and the fan is a radial fan mounted with close clearance in a circular opening in the respective dividing wall.

BRIEF DESCRIPTION OF THE DRAWINGS

The preferred embodiment of the invention is described further with reference to the accompanying drawings, wherein.

DESCRIPTION OF THE PREFERRED EMBODIMENT

Figure 1:
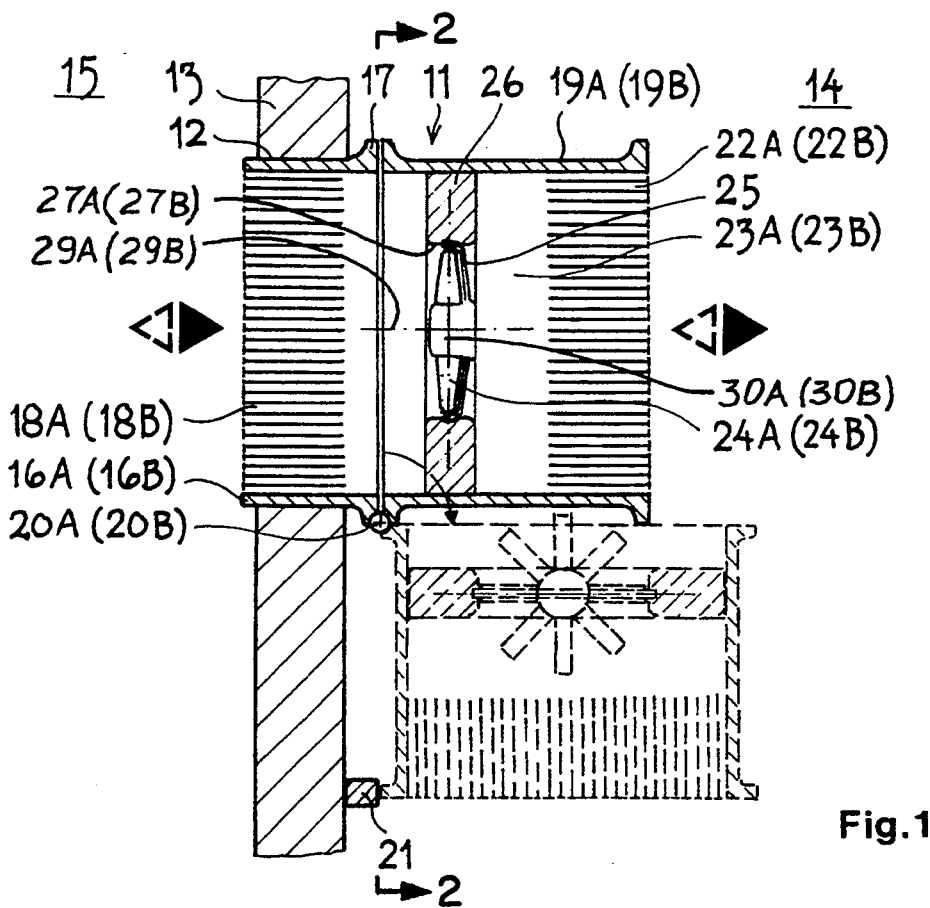
FIG. 1 shows a vertical section centrally through one section of a ventilation device according to the invention.
Figure 2:
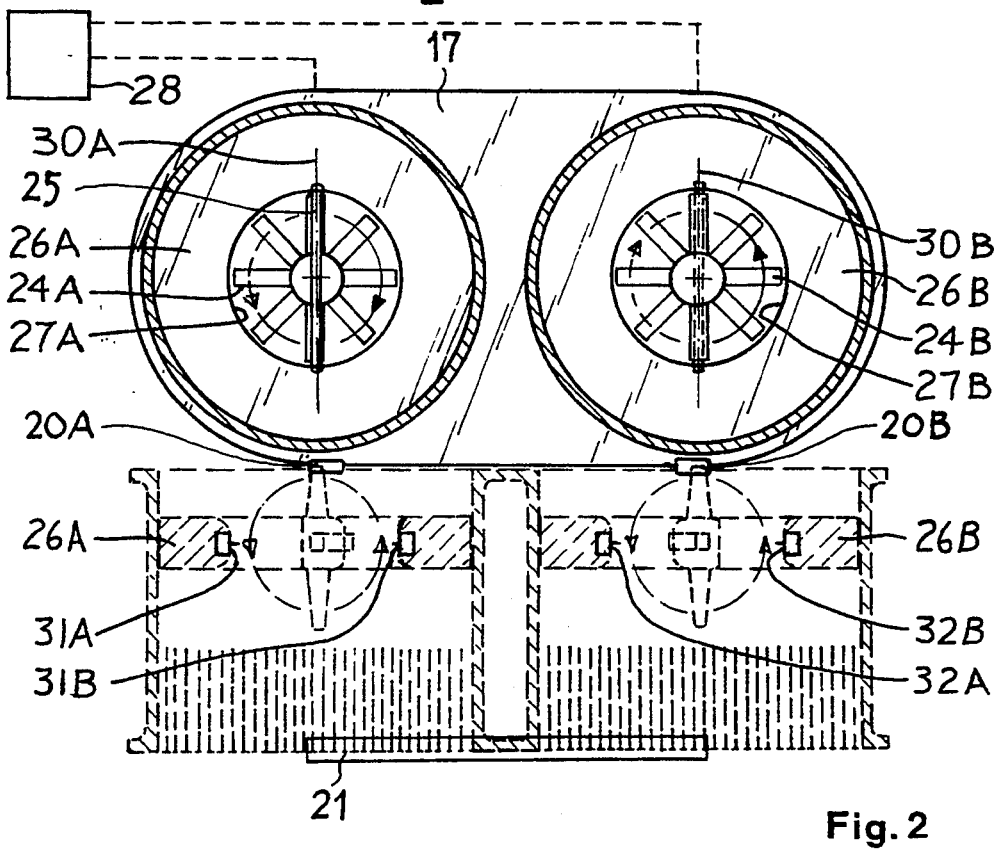
FIG. 2 shows a front view of the inner part of the device, as observed along line 2—2 of FIG. 1, and in both Figures, a pivotable part of the device is showed by ghost lines in a lowered position.

The illustrated ventilation device is denoted with reference numeral 11. It is installed as a unit in an opening 12 in a wall 13 dividing a room from an ambient area 15 with a different enthalpy. The device can also be installed in a reverse manner.

The ventilation device 11 comprises a first set of two identical tube shaped outer elements 16A and 16B adjacently arranged with parallel axes on a carrying plate 17 flush with the inner ends, and situated with close clearance to the inner surface of the wall 13. Inside each of the tube shaped elements 16A and 16B, an outer heat exchange element 18A and 18B is arranged. Said elements may be manufactured by helicaly winding corrugated aluminium foil. Other known heat exchange elements may also be utilized.

On the inner side of the tube shaped elements 16A and 16B relative to the room, a second set of tube shaped inner elements 19A and 19B with a corresponding carrying plate, tube shape and diameter as the first set of tube shaped elements is arranged. The second, inner set of tube shaped elements 19A, 19B are connected to the first elements 16A,16B by a double hinge, 20A,20B attached to the carrying plates at the lower edge of the elements. This enables the second set of tube shaped elements 19A and 19B, as well as attached parts, to be pivoted as shown by the ghost lines in the drawings. The pivotable section can also be arranged to pivot sideways, or the part including the fans and additional elements can be retracted linearly from the mounted position. This may be arranged to effect opening of the electrical supply circuit by internal contacts or by external switching. In the lowered position all parts are easily accessible for cleaning, maintenance and repair. On the inner side of the wall, a support bracket 21 is arranged in a position to support the lowered second set of tube shaped elements 19A, 19B with generally vertical axis.

At the end of each of the inner elements 19A,19B, is arranged an inner heat exchange element 22A,22B, which closely corresponds to the outer heat exchange elements 18A and 18B.

The tube shaped elements in each pair, 16A, 19A, respectively 16B, 19B form a passage 23A, respectively 23B through the wall. Centrally in each passage, is arranged a fan assembly 24A and 24B, each if which having one or an equal plurality of powered radial fanwheels. The fanwheels may be symmetrical or asymmetrically arranged. Each fan with corresponding motor is mounted on a bracket 25 in an annular opening 27A,27B in a wall 26A,26B extending across passages 23A and 23B. This enables the passage area at 27A,27B to be adapted to the fan cross section for efficient air flow along respective flow axes 29A,29B. An alternative embodiment for suspending the fan assembly is described in the following.

In addition to the illustrated elements, the ventilation device may have cover screens, suitable latches to maintain the inner tube shaped elements in their operating position, drainage outlets etc.

The ventilation device is provided with an electrical operating control system 28 providing the following sequence of operation. The fans 24A and 24B are operated at identical speeds with opposite directions of rotation for a period of e.g., 15 seconds, whereafter the direction of rotation (and thus air flow) of both fans is reversed whereupon the fans operate for a corresponding period. The flow direction is reversed continually for both fans at substantially the same time interval. A suction through one passage will be balance by an equal supply of air through the other. Equal pressure conditions in both passages, independent of the direction of operation, and equal loss of pressure in both passages generally, will ensure balanced volumes of air and permanent even pressure conditions in the premises. The equal pressure conditions are mainly due to the fans being generally centrally located between two generally identical heat exchange elements with both fans being identical and in all phases being operated with the same characteristics with the same inlet and outlet conditions on both sides regardless of the air direction.

As an alternative to electrically reversing the fans, each fan 24A,24B can be arranged (e.g., journalled) to be pivotable at intervals of 180° about a vertical axis 30A,30B transverse to its flow axis 29A,29B. In this case, a simultaneous and regular release of the pivoting movement can be carried out by an electrical operating mechanism (e.g., solenoid) activated by controller 28 and corresponding pins or latches 31A,31B,32A,32B engageable with the brackets 25 which have a concentric radius slightly greater than the radius of the fan blades. The brackets 25 may be arranged to turn 180° in a short time movement under the influence of the momentum of the fans. The fans could then rotate continuously and unidirectionally.

To avoid self rotation, a common connected arm with latches, e.g., operated alternatively by a solenoid and a spring operated return, can be arranged. As both fans are operated unidirectionally, fans with asymmetrical blades can be used. As in the first example, a time control mechanism is required to control the intervals operation. The central control systems may in both cases be of known construction and no further description is needed.

In a further alternative, the ventilation passages are separately arranged in the walls of the premises. A passage may for example be arranged at each end of a wall or in opposite walls. In this way a balanced air exchange with a different air current pattern in the premises is achieved.

We claim:

1. In a ventilation device for arrangement in an outer wall of a room which is to be provided with a flow of ambient air, wherein each of two ventilation passages has a heat exchange element and a fan connected to a control system for regularly reversing the flow direction through each passage, the improvement in which each ventilation passage has two separate and generally identical heat exchange elements and the fan is arranged generally centrally between the heat exchange elements.

2. The ventilation device of claim 1, in which each fan is situated in a circular opening in a dividing wall located centrally in each ventilation passage.

3. The ventilation device of claim 2, in which each fan is journalled for pivoting about a transverse axis to the flow direction, and means are provided for regularly pivoting each fan at increments of 180° about said transverse axis.

4. The ventilation device of claim 3, in which each fan is journalled for self-rotation about a respective transverse axis and latch means responsive to the control system are engageable with the fan for regularly stopping self rotation at intervals of 180° about said transverse axis.

5. The ventilation device of claim 2, in which the two ventilation passages are mounted in a single ventilation unit which is divided into two parts which are connected by hinge means for permitting pivoting of one part away from the other part such that one heat exchange element in each passage is likewise pivotable away from the other heat exchange element in the same passage.

6. The ventilation device of claim 1, in which each fan is journalled for pivoting about a transverse axis to the flow direction, and means are provided for regularly pivoting each fan at increments of 180° about said transverse axis.

7. The ventilation device of claim 6, in which each fan is journalled for self-rotation about a respective transverse axis and latch means responsive to the control system are engageable with the fan for regularly stopping self rotation at intervals of 180° about said transverse axis.

8. The ventilation device of claim 7, in which
each fan includes a plurality of blades having a first radius and a concentric bracket having a second radius greater than the first radius, and
the latch means are engageable with the bracket.

9. The ventilation device of claim 6, in which the two ventilation passages are mounted in a single ventilation unit which is divided into two parts which are connected by hinge means for permitting pivoting of one part away from the other part such that one heat exchange element in each passage is likewise pivotable away from the other heat exchange element in the same passage.

10. The ventilation device of claim 1, in which the two ventilation passages are mounted in a single ventilation unit which is divided into two parts which are connected by hinge means for permitting pivoting of one part away from the other part such that one heat exchange element in each passage is likewise pivotable away from the other heat exchange element in the same passage.

11. A ventilation system for arrangement in an outer wall of a room, comprising:
means defining a first ventilation passage for mounting in said wall to establish a first flow axis through said wall, the first ventilation passage including,
two separate and substantially identical outer and inner heat exchange elements arranged in series along the first flow axis, and
first reversible fan means situated on said first axis between said heat exchange elements, for inducing air flow axially in alternating directions between the outer and the inner heat exchange elements;
means defining a second ventilation passage for mounting in said wall to establish a second flow axis through said wall, the second ventilation passage including,
two separate and substantially identical outer and inner heat exchange elements arranged in series along the second flow axis, and
second reversible fan means situated on said second axis between said heat exchange elements, for inducing an air flow axially in alternating directions between the inner and the outer heat exchange elements; and
control means for operating the first and second fan means to sustain air flow from the outer to the inner heat exchange elements in one ventilation passage and from the inner to the outer heat exchange elements in the other ventilation passage, and for reversing the flow direction of the first and second fan means at substantially the same time interval.

12. The ventilation device of claim 11, wherein a dividing wall is provided midway along the flow axis between the inner and outer heat exchange elements of each passage and each fan means is a radial fan mounted with close clearance in a circular opening in the respective dividing wall.

13. The ventilation unit of claim 12, wherein the first passage and the second passage are arranged side-by-side in a ventilation unit mountable in one opening in said room wall.

14. The ventilation device of claim 11, wherein the first passage and the second passage are arranged side-by-side in a ventilation unit mountable in one opening in said room wall.

* * * * *